Aug. 18, 1936.  E. N. JACOBI  2,051,143
SPRING COVER
Filed Feb. 9, 1935  2 Sheets—Sheet 2
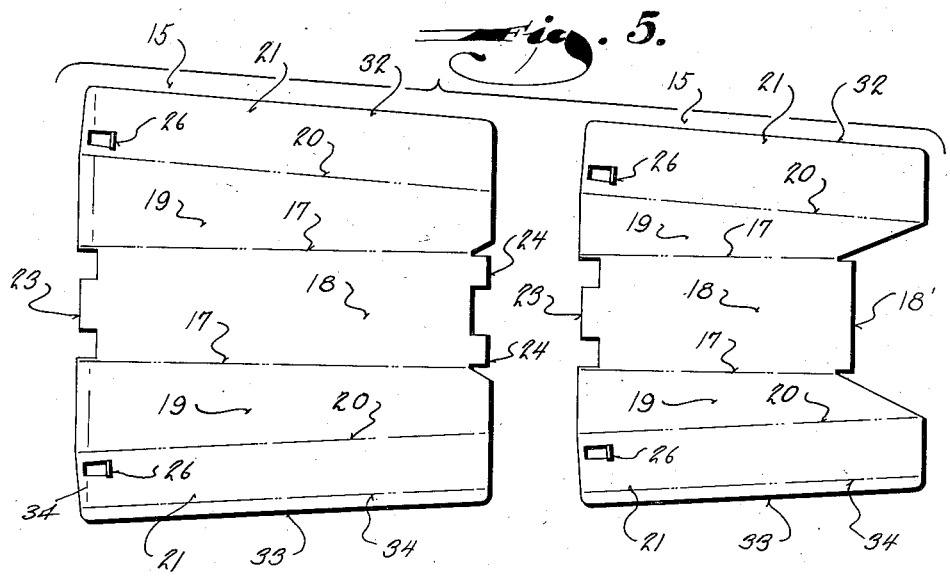
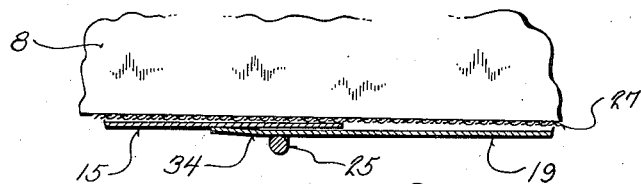
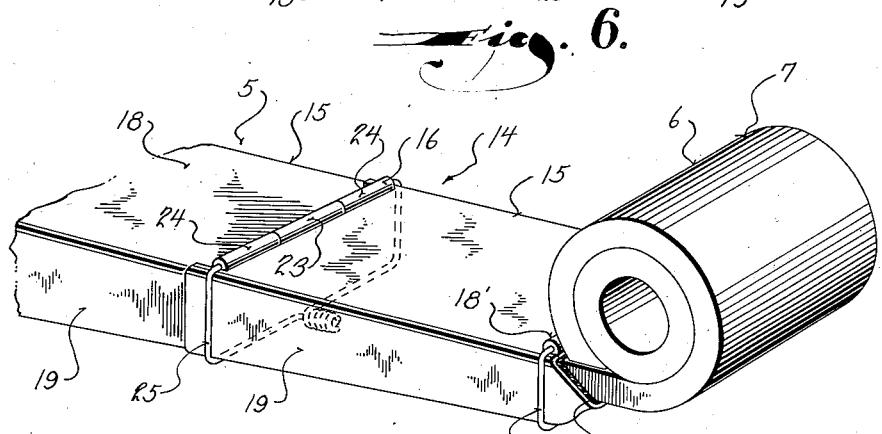
Inventor
Edward N. Jacobi Patented Aug. 18, 1936

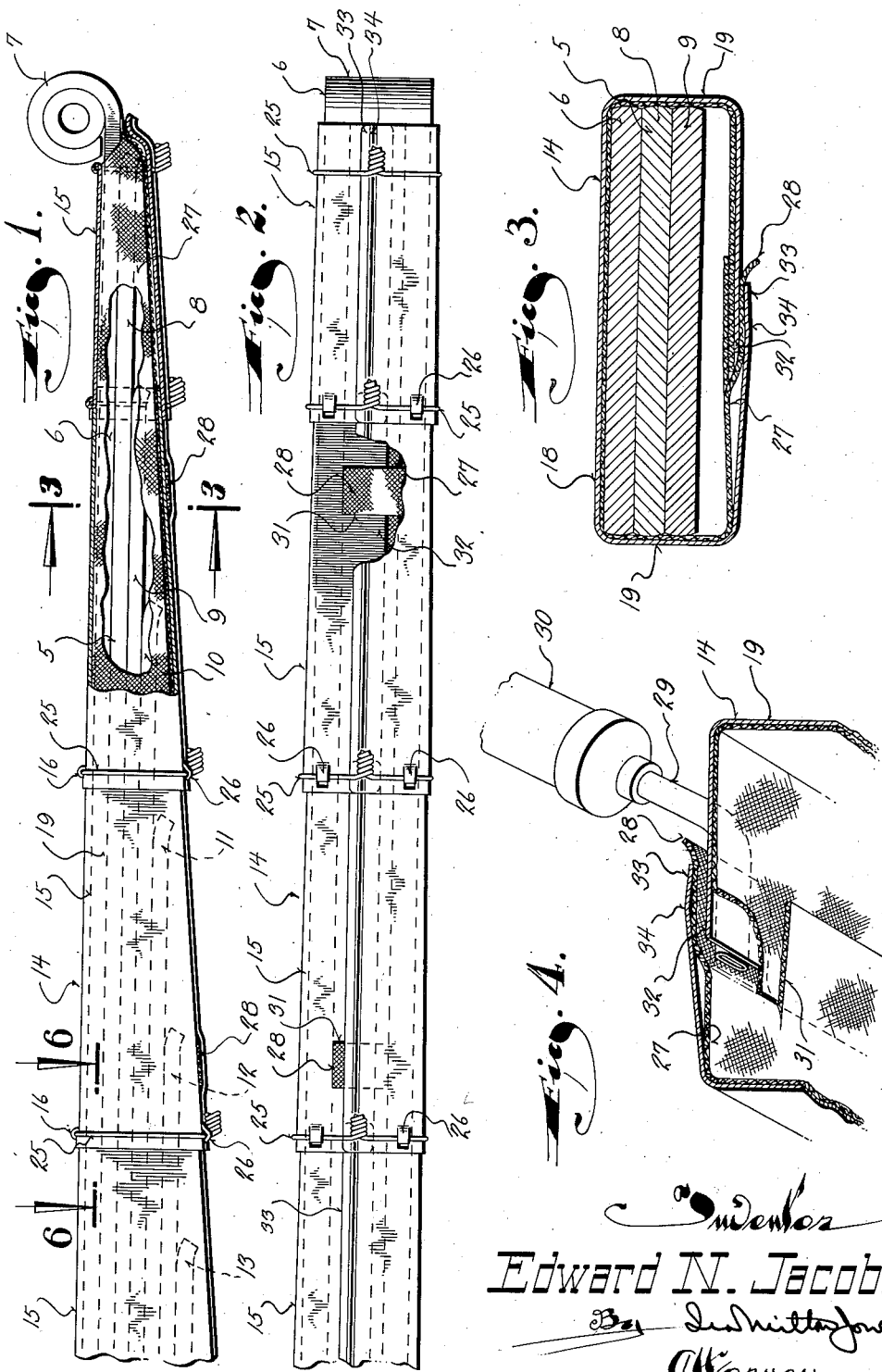

2,051,143

UNITED STATES PATENT OFFICE 2,051,143

SPRING COVER

Edward N. Jacobi, Milwaukee, Wis., assignor to Briggs & Stratton Corporation, Milwaukee, Wis., a corporation of Delaware Application February 9, 1935, Serial No. 5,742

13 Claims. (Cl. 267—37)

This invention relates to improvements in spring covers and refers more particularly to sheet metal covers for automobile leaf springs.

Spring covers now in general use are usually of one piece construction cut and bent to form articulated sections, the hinged connection between the sections necessary to allow for flexure of the spring being formed by the metal of the cover itself. This type of connection requires constant flexing of the material forming the cover, which is obviously objectionable.

Also, the transverse joints between the articulated sections required unsightly gapping connections, which were often pulled open during the formation of the longitudinal seam by which the cover was held on the spring.

With these and other objectionable features of past and existing metal spring covers in view, this invention has as one of its objects to provide a cover in which the necessary hinged connections between the several sections is formed not by the metal of the cover itself but by a wire binding or band securely drawn about the covered spring.

Another object of this invention is to provide a cover which is held in place by a number of such encircling bands rather than by the usual longitudinal seam.

Another object of this invention is to provide a cover wherein both the longitudinal connection between the longitudinal edges of the cover and also the transverse joints between adjacent sections are close fitting and flat throughout their entire extent.

Another object of this invention is to provide a cover for vehicle leaf springs which is readily applicable to the springs of vehicles already in use.

Another object of this invention is to provide a cover for leaf springs which may be readily removed and replaced on the springs without destroying or spoiling the fit and closeness of its joints.

Another object of this invention is to provide a spring cover having novel means for enabling the introduction of lubricant under the cover.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a side view of a conventional vehicle leaf spring with a cover constructed in accordance with this invention applied thereto, parts of the cover being broken away and in section;

Figure 2 is a bottom plan view of the spring and cover;

Figure 3 is an enlarged cross section view taken through Figure 1 on the plane of the line 3—3;

Figure 4 is a detail perspective view illustrating the manner of introducing lubricant under the cover;

Figure 5 is a plan view of two sections of the cover separated from each other and showing the same prior to formation about the spring;

Figure 6 is a detail section view taken through Figure 1 on the plane of the line 6—6; and Figure 7 is a perspective view of one end of the spring to show the adjacent end portion of the cover.

Referring now more particularly to the accompanying drawings in which like numerals indicate like parts throughout the several views, the numeral 5 designates a vehicle leaf spring of conventional construction and comprising a main or master leaf 6 provided with eyes 7 at its opposite ends (only one end portion of the spring being shown), and a plurality of successively shorter secondary leaves 8, 9, 10, 11, 12 and 13.

The cover, indicated generally by the numeral 14, is composed of a plurality of sheet metal sections 15 in overlapped relationship and hingedly connected by hinge joints 16. Each section 15, as best shown in Figure 5, prior to application to the spring is substantially in the form of a trapezoid having parallel ends and converging sides. These sections are bent longitudinally on the lines 17 to form a top wall 18 which overlies the main or master leaf 6 and side walls 19. Other bends 20 outwardly of the bends 17 provide the bottom wall 21. The bottom wall 21, as will be readily apparent, is thus composed of the overlapping outer edge portions of the sections.

As best shown in Figure 5, the ends of the top wall 18 of each section are cut or notched to form projections 23 and 24, the projections 23 being at one end of each cover section and the projections 24 being at the opposite end thereof. These projections 23 and 24 are adapted to interengage, as will be readily apparent, and are curled to provide hinge butts through which a wire 25 is passed to hingedly connect the sections.

The wire 25 passing through the interengaging hinge butts thus forms the hinge connection 16 between adjacent sections. Through the closely interfitting connection between the curled portions 23 and 24 on adjacent cover sections, the hinged connections 16 are secure against the entrance of dust into the cover or the possibility of grease oozing out from the interior thereof, and the uncut end portions on the side and bottom walls of the sections overlap.

It is to be noted that the outer end of the endmost section has one continuous projection 18' on its top wall 18 extending across the entire width thereof which is curled like the portions 23 and 24 to also receive a wire 25. The side and bottom wall portions of this endmost section are extended beyond the said end of the top wall as shown so as to more securely embrace the end of the spring and close the same against the entrance of dirt and foreign matter into the interior of the cover at the outer end thereof.

The wires 25 besides providing a hinge connection between adjacent sections completely encircle the outside of the cover at the overlapping joints between the sections and have their ends twisted together, as shown, so that the wires form reinforcing bands about the spring and serve to hold the cover in place. No other means are provided for holding the cover in place. The longitudinal edges of the bottom wall 21 are merely overlapped and there is no seam between these overlapping portions.

To prevent the wire bands 25 from shifting longitudinally of the spring, tongues 26 are struck up from the bottom walls 21 of the cover sections to be engaged down over the wires, as best shown in Figure 2.

As is customary, the spring prior to the application of the cover thereto is wrapped with a suitable fabric 27, which may be saturated with lubricant prior to its application to the spring. The fabric is so applied to the spring that its overlapping longitudinal edges are adjacent the overlapping longitudinal edges of the cover sections, and to provide means for introducing lubricant into the cover interior, one longitudinal edge of the fabric is provided with one or more (two in the present instance) tabs 28. These tabs 28 project from the adjacent edge of the cover and facilitate the insertion of the flat end 29 of a grease gun 30, or other suitable lubricant charging device, between the cover edges for the purpose of introducing lubricant into the interior of the cover.

The tabs 28 may be separate parts sewed to the fabric 27 or, as in the present instance, may be integral parts of the fabric and formed by slitting one edge thereof transversely as at 31. In applying the cover, the tabs 28 are folded back to allow the inner edge 32 of the adjacent cover section to be disposed thereunder. At all other portions throughout the length of the fabric, this inner edge 32 of the metal cover engages down over the overlapped edges of the fabric and firmly holds the same in place, but the tabs 28, as stated, overlie the outer face of the inner edge 32 and are held down by the outer edge 33 of the metal cover. The tabs 28 extend beyond the edge 33 so that they may be grasped and pulled away from the cover portion 32 to allow the insertion of the grease gun nozzle 29 between the tabs and the cover edge portion 32, as shown in Figure 4.

In this manner, the introduction of lubricant into the interior of the cover may be effected entirely without the need for objectionable grease gun fittings carried by the cover.

To insure a snug closure both at the longitudinal overlapping portions of the cover sections and the transverse overlapping portions between adjacent sections, the outer edge portion in each instance is bent at a slight angle, approximately 10°, as at 34. This causes the outer edges of the cover to press snugly upon the surfaces over which they overlap and obtains a closure made safe by spring tension against the entrance of dirt and foreign matter without objectionable and unsightly seams.

From the foregoing description taken in connection with the accompanying drawings, it will be readily apparent to those skilled in the art to which this invention appertains, that this invention provides a spring cover of greatly improved construction, that the heretofore unsightly and objectionable seams required to secure the cover in place are entirely eliminated, and that connections between the adjacent sections and the overlapping edges of the sections themselves are made secure against the entrance of dirt and foreign matter without necessitating unsightly bulges.

It is also evident that by forming the cover from separate sections rather than in one piece, the cover may be more economically manufactured as smaller pieces are used and consequently smaller machines may be employed, and also that by the elimination of the bending type of hinge connection between the adjacent sections, the objectionable possibility of the hinge joint breaking from continued flexing of the metal is precluded. The material heretofore required for the lock seam by which the cover was secured to the spring is also obviated with this construction so that a further saving in cost is effected.

What I claim as my invention is:

1. In a spring cover for vehicle leaf springs, a plurality of end to end sections, hinging and securing and common means embracing the cover and providing hinged connections between the sections and securing the cover to the spring.

2. A spring cover for vehicle leaf springs comprising a plurality of sections arranged end to end on the spring, interfitting hinge bearings on adjacent ends of the sections, and wire bands having portions thereof forming hinge pins engaging said hinge bearings on the ends of the sections to hingedly connect the sections and also embracing the covered spring to hold the cover on the spring.

3. A spring cover for leaf springs comprising a plurality of sections arranged end to end on the spring, each section having walls to cover the top, sides and bottom of the spring, means on the adjacent portions of one wall of said sections arranged for interengagement to provide hinge butts, and flexible hinge pins having their middle portions passed through said hinge butts and their end portions embracing the covered spring and connected together to hold the cover on the spring.

4. A spring cover for vehicle leaf springs comprising a plurality of sheet metal sections, each section being adapted to completely encircle a portion of the spring, and said sections being arranged in endwise overlapping relationship, means on certain walls of said sections providing hinge butts, and wires passed through said hinge butts to hingedly connect the sections, the end portions of said wires encircling the overlapped portions of the sections and being twisted together to firmly secure the cover sections on the spring.

5. A leaf spring cover comprising the combination of a plurality of relatively movable sections, means on certain walls of said sections adapted to interengage and provide hinge butts, hinge pins passing through said hinge butts to hingedly connect the sections, and means on the ends of the hinge pins arranged to embrace and hold the spring cover on the spring.

6. In a vehicle leaf spring cover, a plurality of relatively movable sections arranged in end to end relationship and each section completely encircling a portion of the spring, and wire loops providing hinged connections between the sections and embracing the cover and spring to securely lock the cover on the spring.

7. In a cover for vehicle leaf springs, a fabric wrapping encircling the spring, a sheet metal covering surrounding the wrapping and having overlapping edge portions, and means carried by the wrapping and projecting from the overlapping outer edge of the metal covering to facilitate the insertion of the nozzle of a lubricant injector between the overlapping edges of the metal covering for the purpose of injecting lubricant under the covering.

8. In a spring cover for vehicle leaf springs, a fabric wrapping encircling the spring and having overlapping edge portions, the outer edge portion of the fabric being cut to provide a tab, a metal covering encircling the wrapping and having overlapping edge portions, the inner edge portion engaging down over the overlapped portions of the wrapping but being under said tab, and said tab projecting out from the edge of the outer overlapping portion of the metal covering to facilitate the insertion of the nozzle of a lubricant injector under the tab and between the overlapping portions of the metal covering to allow injection of lubricant under the wrapping.

9. In a covering for vehicle leaf springs, a fabric wrapping encircling the spring and having overlapping edges, a sheet metal covering encircling the wrapping and having overlapping edges, and means on the fabric wrapping and projecting from the overlapped edges of the metal covering to guide the nozzle of a lubricant injector between the overlapped edges of the metal covering and into the interior of the wrapping to enable injection of lubricant into the space under the wrapping.

10. In a covering for vehicle leaf springs, a fabric wrapping encircling the spring, a metal covering encircling the wrapping and having overlapping edges, and a tab carried by the fabric and projecting from the outer overlapping edge of the metal covering to permit the same to be grasped for pulling said outer edge of the metal covering away sufficiently to enable the insertion of the nozzle of a lubricant injector between the overlapped edges of the covering to facilitate the injection of lubricant under the fabric.

11. In a covering for vehicle leaf springs, a fabric wrapping encircling the spring, a metal covering encircling the wrapping and having overlapping joints at its edge portions, means to maintain said joints closed with spring tension, and a tab carried by the fabric and projecting from certain of said overlapping joints to provide means for pulling said joints open against said spring tension to enable the insertion of the nozzle of a lubricant injector into said overlapping joints.

12. A cover for leaf springs comprising a sheet metal member encircling a portion of the spring with one edge overlapping the other, said overlapping edge being sprung toward the edge it overlaps so that the portion of the sheet metal member adjacent to but spaced from the overlapping edge is bowed away from the spring, and constricting means encircling the cover to bind the same onto the spring and thereby restrain the outward bowing and press said overlapping edge upon the other which it overlaps.

13. A cover for vehicle leaf springs comprising a plurality of cover sections each adapted to completely encircle a portion of the spring, means to hingedly connect the adjacent sections with the end portions thereof overlapped, the outer overlapping end portions being sprung toward the portions they overlap whereby the portions of the sections remote from the ends of the outer overlapping portions are bowed away from the spring, and constricting means encircling the cover at the joints between its sections and substantially over the portions bowed the maximum distance from the spring to bind the cover sections about the spring and thereby restrain the outward bowing and press said overlapping end portions upon the portions which they overlap.

EDWARD N. JACOBI.

CERTIFICATE OF CORRECTION.

Patent No. 2,051,143.  August 18, 1936.

EDWARD N. JACOBI.

It is hereby certified that error appears in the printed specification of the above numbered patent requiring correction as follows: Page 2, second column, line 45-46, claim 1, strike out the words "hinging and securing" and insert the same after "common" in line 46, same claim; and that the said Letters Patent should be read with this correction therein that the same may conform to the record of the case in the Patent Office.

Signed and sealed this 20th day of October, A. D. 1936.

(Seal)

Leslie Frazer
Acting Commissioner of Patents.